Patented June 15, 1943

2,321,884

UNITED STATES PATENT OFFICE 2,321,884

OIL FILTER

Philip Sidney Allam, Little Chesterford, near Saffron Walden, England, assignor to Simmonds Development Corporation Limited, Aldwych, London, England No Drawing. Application April 29, 1941, Serial No. 390,997. In Great Britain May 29, 1940

5 Claims. (Cl. 196—16)

This invention relates to oil filters of the kind comprising a mass of porous material through which the oil is passed, and more particularly though not exclusively to filters for filtering lubricating oils used in the lubrication of internal combustion engines.

The invention has for its object the provision of a filtering material that not only serves to remove particles suspended in the oil but also to neutralize undesired acidity of the oil.

The improved filtering material in accordance with the present invention comprises a porous filtering medium impregnated with or otherwise having intimately admixed therewith an alkylene di- or poly-amine containing at least one amino-substituted hydroxyalkyl group.

As the porous filtering medium there is employed a material which will permit percolation therethrough of the oil to be purified but which will serve to retain any particles colloidally or otherwise suspended in the oil. An example of a suitable porous filtering medium is cotton waste. The amino-substituted alkylene di- or poly-amine employed is preferably substantially immiscible with the oil to be filtered and should be substantially stable and non-volatile at the temperature of filtration. Examples of amines which may be used are ethylenediamine, diethylenetriamine, triethylenetetramine and tetraethylenepentamine, such amines containing one or more amino-substituted hydroxyalkyl, e. g. hydroxyethyl, groups. The di- or poly-amine may contain other substituted groups, for example, one or more alkyl groups.

Specific examples of amines which may be employed in accordance with the present invention are those having the following structural formulae:

(1)  $HO.C_2H_4.NH.C_2H_4.NH.C_2H_4.OH$
(2)  $HO.C_2H_4.NH.C_2H_4.NH.C_2H_4.NH.C_2H_4.OH$
(3)  $HO.C_2H_4.NH.(C_2H_4.NH)_2.C_2H_4.NH.C_2H_4.OH$
(4)  $(HO.C_2H_4)_2N.(C_2H_4.NH)_2.C_2H_4.NH_2$ (5) 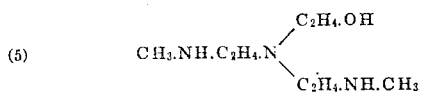

The amine is intimately admixed with the cotton waste or other porous filtering medium. For example, the amine may be dissolved in a suitable solvent and the porous filtering medium impregnated with the solution, the solvent, if desired, being subsequently removed.

In use, the filtering material is housed in a suitable container which is connected to the desired oil flow line. To facilitate replacement of the filtering material when required, it is preferably housed in a suitable casing to form a cartridge adapted to be readily inserted in and remodel from the container.

The amines employed in accordance with this invention combine directly with acid present or formed in the oil without the liberation of water and since such compounds have a plurality of amino groups, a given amount of the amine is able to neutralize a relatively large amount of acid. In this manner the filtering material may be used for relatively long periods before requiring replacement. The amines also assist in the filtration of the oil since they help the retention of finely divided and colloidally suspended particles present in the oil by the cotton waste or other porous filtering medium employed.

The term "an alkylene polyamine" used in the appended claims is intended to include an alkylene diamine.

I claim:

1. An oil filter comprising a porous filtering medium having intimately admixed therewith an alkylene polyamine containing at least one amino-substituted hydroxyalkyl group.

2. An oil filter comprising a porous filtering medium having intimately admixed therewith an amine having the structural formula

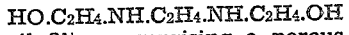

3. An oil filter comprising a porous filtering medium having intimately admixed therewith an amine having the structural formula

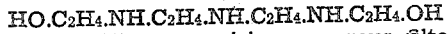

4. An oil filter comprising a porous filtering medium having intimately admixed therewith an amine having the structural formula

5. For use in an oil filter, a cartridge adapted to be readily inserted in and removed from a container, said cartridge containing a mass of porous filtering medium having intimately admixed therewith an alkylene polyamine containing at least one amino-substituted hydroxyalkyl group.

PHILIP SIDNEY ALLAM.